(12) United States Patent
Takaike

(10) Patent No.: US 6,384,845 B1
(45) Date of Patent: May 7, 2002

(54) DISPLAY APPARATUS FOR INTERLOCKED MOVEMENT OF SCROLL BUTTONS AND SCROLL BOX OF SCROLL BAR, DISPLAY CONTROL METHOD AND STORAGE MEDIUM

(75) Inventor: Shinichi Takaike, Matsumoto (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/288,699

(22) Filed: Apr. 9, 1999

(30) Foreign Application Priority Data

Jun. 25, 1998 (JP) ............................................. 10-178942

(51) Int. Cl.[7] ................................................ G06F 3/00
(52) U.S. Cl. ...................... 345/786; 345/784; 345/833
(58) Field of Search ................................ 345/781, 784, 345/786–787, 830, 833, 856

(56) References Cited

U.S. PATENT DOCUMENTS

| | | | |
|---|---|---|---|
| 5,686,937 A | 11/1997 | Li ................................ | 345/684 |
| 5,864,330 A | * 1/1999 | Haynes ......................... | 345/856 |
| 5,923,861 A | * 7/1999 | Bertram et al. .............. | 345/786 |
| 6,073,136 A | * 6/2000 | Bertram et al. .......... | 345/784 X |
| 6,208,343 B1 | * 3/2001 | Roth ........................... | 345/786 |

FOREIGN PATENT DOCUMENTS

JP 7-182135 7/1995

OTHER PUBLICATIONS

IBM Technical Disclosure Bulletin "Host–Based Character Application Access to Scroll Bar Entry Fields," IBM Corp. vol. 34, No. 10A, p. 51–53, Mar. 1992.*
IBM Technical Disclosure Bulletin, "Scroll Control Box," IBM Corp., vol. 36,No. 04, p. 399–403, Apr. 1993.*

* cited by examiner

Primary Examiner—Raymond J. Bayerl
Assistant Examiner—X. L. Bautista
(74) Attorney, Agent, or Firm—Staas & Halsey LLP

(57) ABSTRACT

A scroll box for displaying the size and position of the data displayed on the screen of a display apparatus relative to the whole data and a plurality of scroll buttons operated when scrolling the data on said screen are displayed in a scroll bar displayed on the screen. When one of the scroll buttons is operated, the data is scrolled on the screen and the scroll box is moved in the scroll bar. The scroll buttons are moved in the scroll bar in operatively interlocked relation with the scroll box. As a result, the distance between adjacent scroll buttons is shortened and the amount of operation required for operating the scroll buttons can be reduced.

20 Claims, 11 Drawing Sheets

DISPLAY APPARATUS FOR INTERLOCKED MOVEMENT OF SCROLL BUTTONS AND SCROLL BOX OF SCROLL BAR, DISPLAY CONTROL METHOD AND STORAGE MEDIUM

BACKGROUND OF THE INVENTION

1. Field of the Invention

The present invention relates to an apparatus and a method for displaying a scroll bar on the screen of a display apparatus of a computer, a word processor, various terminals and various portable electronic equipment in order to scroll the data displayed on the screen of the display apparatus.

2. Description of the Related Art

The scroll bar is displayed on the screen of a display apparatus of a personal computer or the like. The scroll bar includes a plurality of scroll buttons and a scroll box. The length of the scroll box with respect to the whole length of the scroll bar represents the size of the data displayed on the screen relative to the whole data. The position of the scroll box with respect to the scroll bar represents the position of the data displayed on the screen relative to the position of the whole data. A plurality of scroll buttons are arranged fixedly on the screen. The scroll buttons are provided for determining the direction and speed of scroll, respectively.

The operator desirous of scrolling the data on the screen operates a pointing device such as a mouse to move a pointer to the scroll bar, and after setting the pointer to the desired scroll button, depresses the mouse button. Then, the document on the screen scrolls in the direction and at the rate corresponding to the scroll button depressed. In operatively interlocked relation with the scroll of the data, the scroll box moves in the scroll bar. The scroll speed, on the other hand, is controlled to add the speed progressively as the scroll button is kept depressed.

In conventional display apparatuses, the scroll box moves in the scroll bar while the scroll buttons are fixedly arranged in the scroll bar. The resulting larger distance between the scroll box and the scroll buttons increases the mount of operation of the pointing device for moving the pointer. Also, for the scroll to be continued on the screen, the scroll button is required to be kept depressed. In the case where the scroll speed is increased by keeping the scroll button depressed, the scroll speed cannot be easily controlled. In the conventional display apparatus, therefore, the scroll bar cannot be easily operated.

SUMMARY OF THE INVENTION

The object of the present invention is to provide a display apparatus comprising an easy-to-operate scroll bar and a method of controlling the display.

The present invention has been developed to achieve the above-mentioned object.

According to the present invention, there is provided a display apparatus and a display control method for displaying a scroll bar including a plurality of scroll buttons and a scroll box for displaying data in scroll, wherein the scroll buttons and the scroll box are moved in operatively interlocked relation. The scroll buttons and the scroll box can be displayed integrally.

In scrolling data according to the invention, the pointing device is operated so that the pointer on the screen is set to a scroll button. Then the scroll button is depressed. This operation causes the data on the screen to be scrolled while at the same time moving the scroll box and the scroll buttons in operatively interlocked relation. Unlike the conventional fixed scroll buttons, therefore, the distance between the scroll buttons can be shortened. As a result, the coverage of the distance for operating the pointing device is reduced and the scroll operation is facilitated.

In the present invention, the conventional fixed scroll buttons can both be arranged on the scroll bar.

Further, a scroll button for line-by-line scroll and/or a scroll button for page-by-page scroll operatively interlocked with the scroll box can be provided.

According to the present invention, when a scroll button is depressed by the pointer, the scroll button moves in operatively interlocked relation with the scroll box. According to the invention, therefore, the pointer is controlled to move with the scroll buttons. This eliminates the operation for moving the pointer in accordance with the movement of the scroll box after a scroll button is depressed, thereby improving the operability.

Also, according to the invention, the scroll speed can be changed in accordance with the operation of the pointing device or, for example, the movement of the mouse. This permits the operator to control the scroll speed arbitrarily.

BRIEF DESCRIPTION OF THE DRAWINGS

The above object and features of the present invention will be more apparent from the following description of the preferred embodiment with reference to the accompanying drawings, wherein:

FIGS. 10A and 10B show a first modification of the scroll bar according to the invention, in which FIG. 10A shows a screen and FIG. 10B a horizontal scroll bar; and FIGS. 11A and 11B show a second modification of the scroll bar according to the invention, in which FIG. 11A shows a vertical scroll bar and FIG. 11B a horizontal scroll bar.

DESCRIPTION OF THE PREFERRED EMBODIMENTS

Before describing the embodiments of the present invention, the related art and the disadvantage therein will be described with reference to the related figures.

Figure 1A:
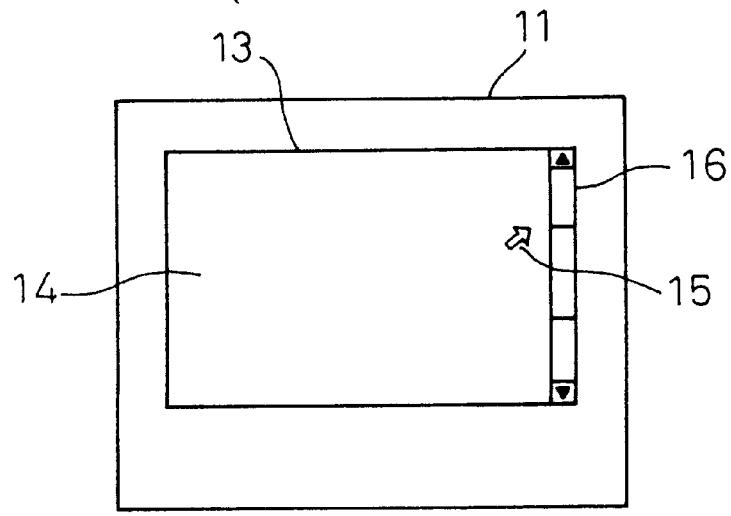
FIG. 1A shows a screen using a conventional scroll bar, and FIG. 1B the scroll bar.

FIG. 1A shows a screen 11 of a personal computer. A scroll bar 16 is displayed on the right side of the screen 11, and a document (data) 14 is displayed in a window 13. Also, a pointer 15 is displayed on the screen 11. In the case of a document of large capacity, only a portion of the document 14 is displayed on the screen 11. When the portion of the document not displayed on the screen 11 is to be displayed on the screen 11, a mouse constituting a pointing device is operated to move the pointer 15 to the scroll bar 16. With the pointer 15 set to a predetermined scroll button, the mouse button is depressed. Then the scroll button is depressed to scroll the document 14.

Figure 1B:

FIG. 1B shows a configuration of the scroll bar 16. Scroll buttons A and I are arranged at the upper and lower ends of the scroll bar 16, respectively. The mouse is operated so that the scroll button A is depressed by the pointer 15. Then, the document 14 is scrolled upward by one line. In the case where the lower scroll button I is depressed, on the other hand, the document 14 is scrolled downward by one line. This scroll operation can be continued by keeping the mouse button depressed.

A scroll box E is arranged in the area inside the scroll buttons A and I. The length of the scroll box E with respect to the whole length of the scroll bar 16 represents the size of the document A displayed on the window 13 relative to the whole size of the document. The position of the scroll box E in the scroll bar 16, on the other hand, represents the relative position of the whole document.

The document displayed in the window 13 can be scrolled by dragging the scroll box E. With the pointer 15 set to the scroll box E by mouse operation, the mouse button is depressed. Under this condition, the mouse is moved. Then, the pointer 15 and the scroll box E are moved. Once the scroll box E is moved to the desired position, the corresponding portion of the document 14 is displayed in the window 13.

The area between the scroll buttons A, I and the scroll box E is regarded as the areas B, H, respectively, for scrolling page by page. When these scroll areas B, H are depressed by the pointer 15, the document 14 is scrolled by one page. When the upper scroll area B is depressed, the preceding page is displayed in the window 13, while when the lower scroll area H is depressed, the next page is displayed. This page-by-page scroll can be continued by keeping the scroll button depressed.

Also, continue to scroll with the scroll button kept depressed. The scroll speed is automatically increased in steps. As a result, the time required to reach the desired line or page is shortened when the line or page coverage is large.

An embodiment of the invention will be explained below.

Figure 2:
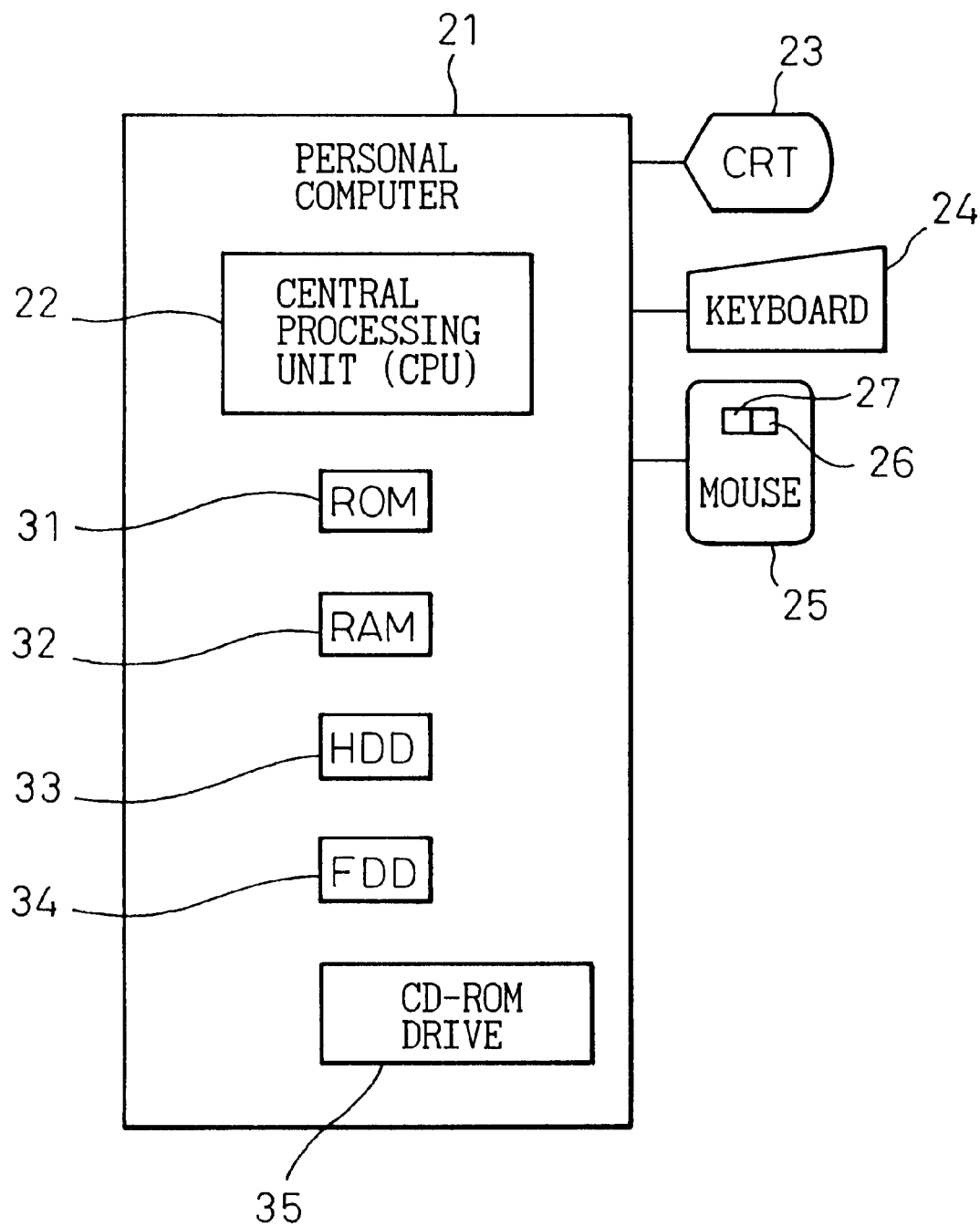
FIG. 2 shows a hardware configuration of an apparatus to which the invention is applied.

FIG. 2 is a diagram showing a hardware configuration of an equipment for mounting an apparatus for displaying the scroll bar according to the invention. This equipment is a computer, a word processor, various terminals, various portable electronic equipment or the like. The description that follows refers to the personal computer as an example equipment.

A personal computer 21 has a central processing unit (CPU) 22 built therein, and is connected with external devices such as a CRT 23, a keyboard 24 and a mouse 24. The mouse 25 has a right button 26 and a left button 27. The mouse 25 which is used as a pointing device in the description of this embodiment can be replaced by such device as the keyboard 24 or the light pen (not shown) with equal effect.

The personal computer 21 has further built therein a ROM 31, a RAM 32, a hard disk drive (HDD) 33, a floppy disk drive (FDD) 34 and a CD-ROM drive 35. The program of the invention is recorded in various recording media such as a floppy disk and a CD-ROM, and installed from the recording media into the hard disk. In compliance with an instruction to execute the program, the program is loaded into the RAM 32 thereby to realize the functions of various means within the scope of the claims of the invention.

Figure 3A:
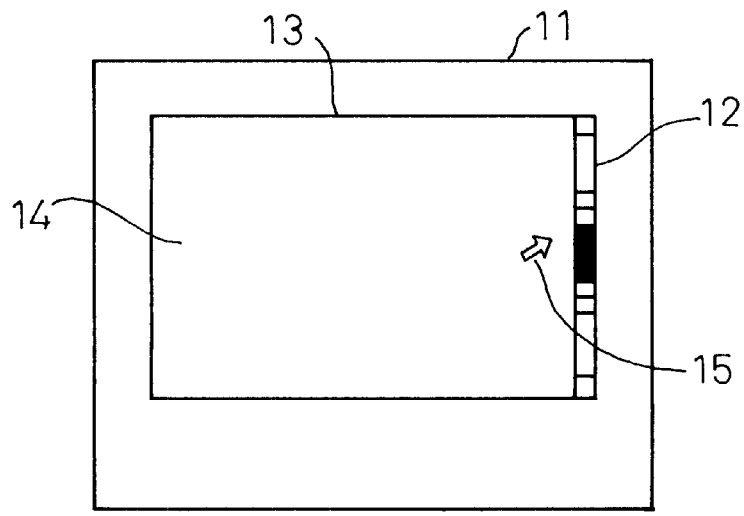
FIG. 3A shows a screen using a scroll bar according to the invention, and FIG. 3B the scroll bar.

FIG. 3A shows a screen 11 of the CRT 23.

A window 13 is displayed at the center of the screen 11, and a document 14 is displayed as data in the window 13. A scroll bar 12 is displayed vertically on the right side of the screen 11. The scroll bar 12 is operated by a mouse 25 so that the document 14 displayed on the screen 11 is scrolled vertically.

Figure 3B:
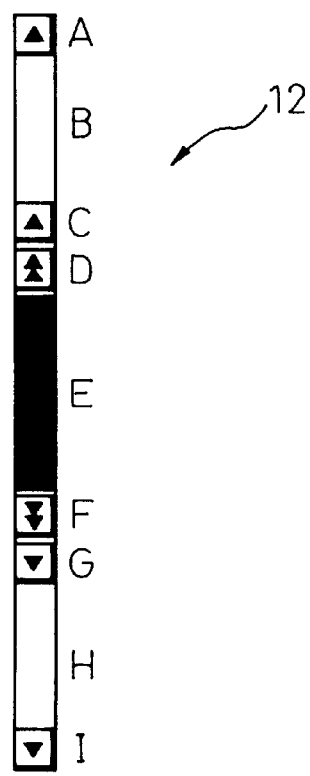

FIG. 3B shows a configuration of the scroll bar 12.

The scroll bar 12 has scroll buttons A and I at the upper and lower ends thereof, respectively. The scroll buttons A and I are similar to the conventional scroll buttons A and I. When the pointer 15 is set to the scroll button I at the lower end by operating the mouse 25 and the left button 27 is depressed, the scroll button I is automatically depressed, so that the document 14 is scrolled downward by one line. On the other hand, the scroll button A at the upper end is operated to scroll the document 14 upward by one line. In this scroll operation, the document is fed by one line by clicking the left button 27 of the mouse 25 and continues to be scrolled by keeping the left button 27 depressed.

The scroll box E is arranged in the area inside the scroll buttons A and I. The scroll box E is called "the elevator" in MS-Windows. This scroll box E has arranged two scroll buttons C, D and F, G at each of the upper and lower ends thereof, respectively. The scroll buttons C, D, F, G will be described later.

The length of the scroll box E with respect to the length of the scroll bar 12 represents the size of the portion of the document displayed in the window 13 relative to the whole size of the document 14. Also, the position of the scroll box E in the scroll bar 12 represents the position of the portion of the document displayed in the window 13 relative to the whole document.

The scroll box E, like the conventional scroll box, is used for dragging. The pointer 15 is set to the scroll box E by operating the mouse 25, and moves the mouse 25 with the left button 27 thereof kept depressed. With the movement of the mouse 25, the pointer 15 and the scroll box E move within the scroll bar 12. Also, the document 14 is scrolled with the movement of the scroll box E. When the left button 27 is released, and the dragging process ends.

The areas B, H between the scroll buttons A, I at the upper and lower ends and the scroll box E are the areas for scrolling page by page, as in the prior art. When the scroll area B or H is depressed by the pointer 15, the document 14 is scrolled by one page. When the mouse 25 is moved and set to the lower scroll area H and the left button 27 is depressed the scroll area H is depressed, and the next page is displayed in the window 14. When the upper scroll area B is depressed, on the other hand, the preceding page is displayed. This page-by-page scroll can also be continued by keeping the scroll area depressed.

The scroll buttons C, D, F and G integrated with the scroll box E constituting a feature of the invention will be explained below.

The scroll buttons C and G arranged at the ends are for line-by-line scroll. Each button has an arrow indicated therein. When the mouse 25 is operated and the pointer 15 is set to the scroll button G at the lower end and the left button 27 is depressed the scroll button G is automatically depressed, and the document 14 is scrolled downward line by line. When the left button 27 is kept depressed, on the other hand, the screen is kept scrolled line by line.

With the scroll of the document 14, the scroll box E also moves downward in the scroll bar 12. The movement of the scroll box E causes the movement of the scroll button G. At the same time, the pointer 15 is also moved. Even if the mouse 25 is not moved, therefore, the pointer 15 never comes off from the scroll button G. As a result, the integrated structure of the scroll buttons and the scroll box does not reduce the operability, and facilitates the operation of the mouse 25. The scroll button C at the upper end is also operated in similar manner except that the document 14 is scrolled upward instead of downward.

The scroll buttons D and F are for page-by-page scroll. Each button has two arrows indicated therein. When the mouse 25 is operated so that the pointer 15 is set to the scroll button F at a lower position and the left button 27 is depressed, the scroll button F is automatically depressed and the document 14 is scrolled downward page by page. In the case of the upper scroll button D, on the other hand, the document 14 is scrolled upward by one page. This scroll can also be continued by keeping the left button 27 depressed.

With the scroll of the document 14, the scroll box E is moved vertically in the scroll bar 12. The movement of the scroll box E causes the movement of the scroll buttons D and F. At the same time, the pointer 15 is controlled to move. Without moving the mouse 25, therefore, the pointer 15 is prevented from coming off from the scroll buttons D and F. Thus, the integrated structure of the scroll buttons and the scroll box does not reduce the operability and facilitates the scroll operation.

Now, the specific operation of the scroll buttons A to I of the scroll bar 12 will be explained with reference to a flowchart.

Figure 4:
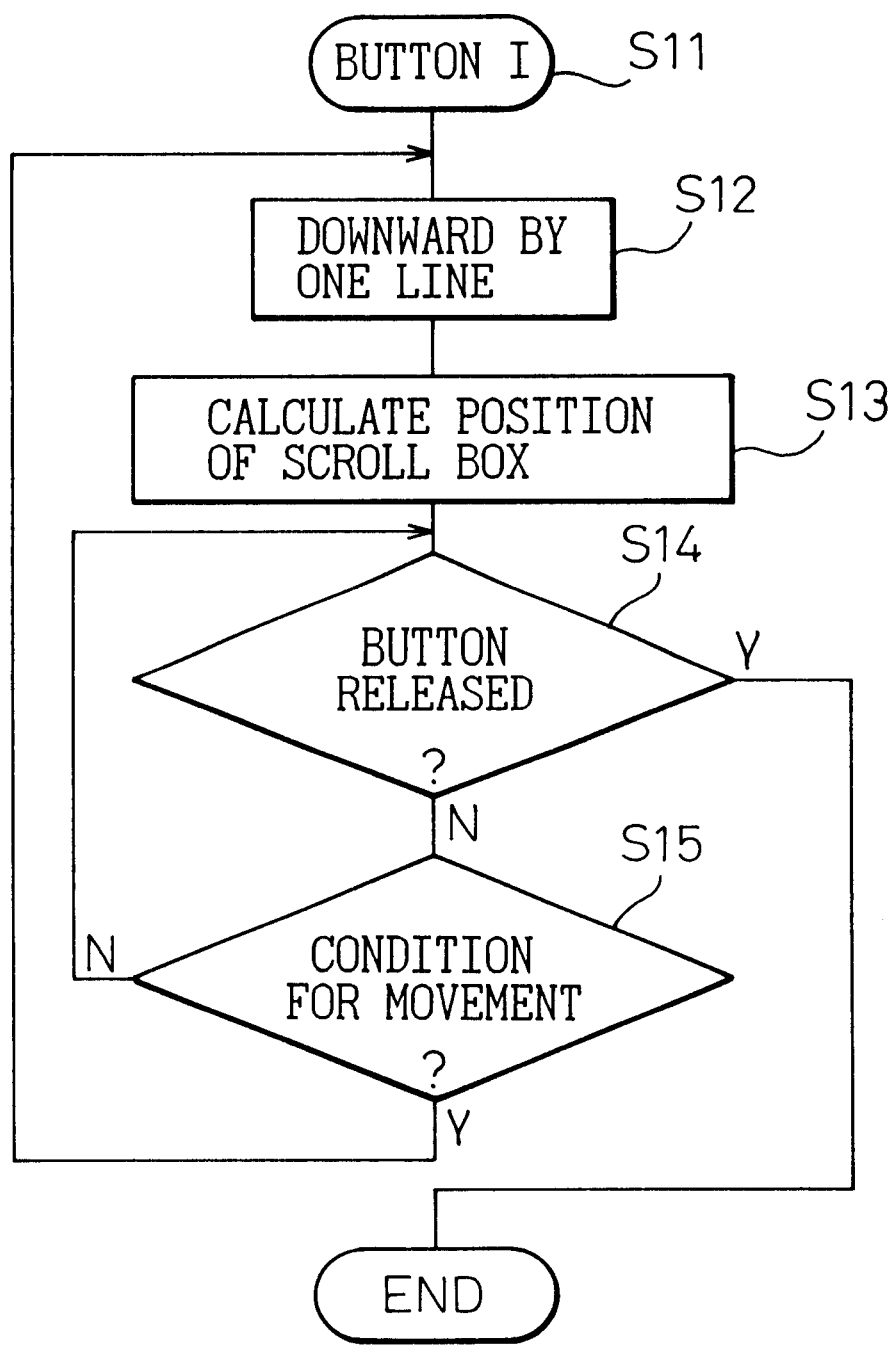
FIG. 4 is a flowchart for explaining the first operation in which the scroll buttons of the scroll bar shown in FIG. 3 are depressed.

FIG. 4 shows the operation with the scroll button I depressed. The operation of the scroll button I is similar to that of the conventional one described above.

When the mouse 25 is operated to set the pointer 15 to the scroll button I, the left button 27 of the mouse 25 is depressed and the scroll button I is also depressed (step S11), the document 14 is scrolled downward by one line in the window 13 (step S12). The position of the scroll box E is calculated, and the scroll box E is displayed at the calculated position in the scroll bar 12 (step S13).

Step S14 decides whether the finger of the operator is off the mouse button. If the finger is not off but keeps the button depressed (N of step S14), step S15 decides whether the condition for movement has been met or not. The condition for movement is the next scroll timing that arrives after the lapse of a predetermined length of time. In the case where the predetermined time passes with the left button 27 kept depressed, the process returns to step S12 to scroll the document 14 downward by one more line.

If the left button 27 is kept depressed, therefore, the line-by-line scroll is continued. At the time point when the finger leaves the left button 27 (Y of step S14), the process ends and the scroll stops. In the case where the left button 27 is clicked, on the other hand, the scroll ends after moving by one line.

An explanation will be given about the case in which the scroll button A located at a position symmetric with respect to the scroll button I is depressed. In this case, step S11 of FIG. 4 is changed to depress the scroll button A, and the document 14 is scrolled upward instead of downward in step S12. The other overlapped steps will not be described.

Figure 5:
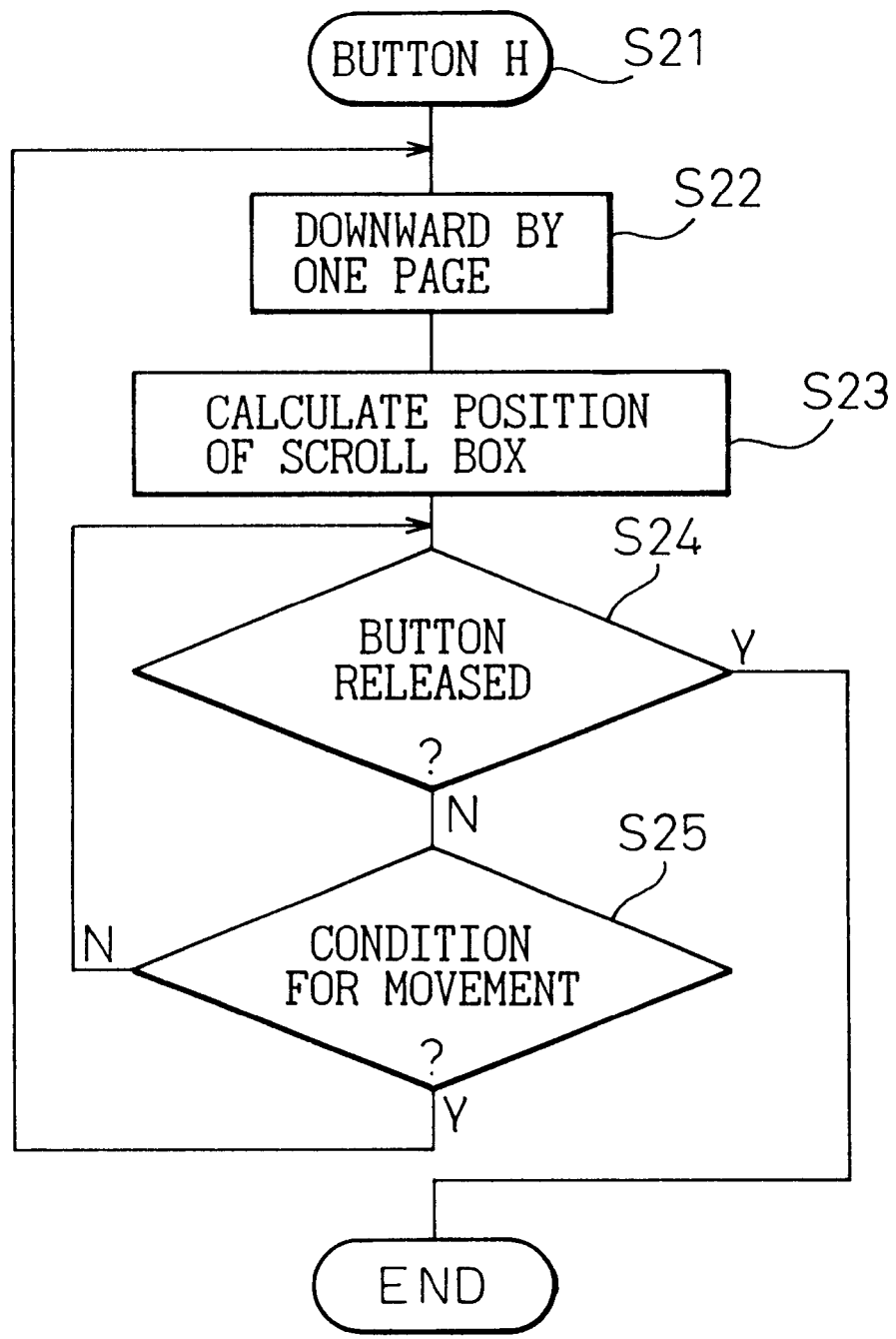
FIG. 5 is a flowchart for explaining the second operation in which the scroll buttons of the scroll bar shown in FIG. 3 are depressed.

FIG. 5 shows the operation with the scroll button H depressed. The operation of the scroll button H is similar to that of the conventional case described above.

The operation shown in FIG. 5 is also substantially similar to that of FIG. 4. When the scroll button H is depressed in step S21, the document 14 is scrolled downward by one page in step S22. The subsequent steps of operation are similar to those of FIG. 4, except that the step numbers in the order of ten in FIG. 4 are replaced by step numbers in the order of twenty. Refer to the explanation of the operation in FIG. 4.

Explanation will be made about the case in which the scroll button B located at a position symmetric with respect to the scroll button H is depressed. In this case, step S21 in FIG. 5 is changed to depress the scroll button B, and the document 14 is scrolled upward instead of downward in step S22. The other overlapped steps are not described.

Figure 6:
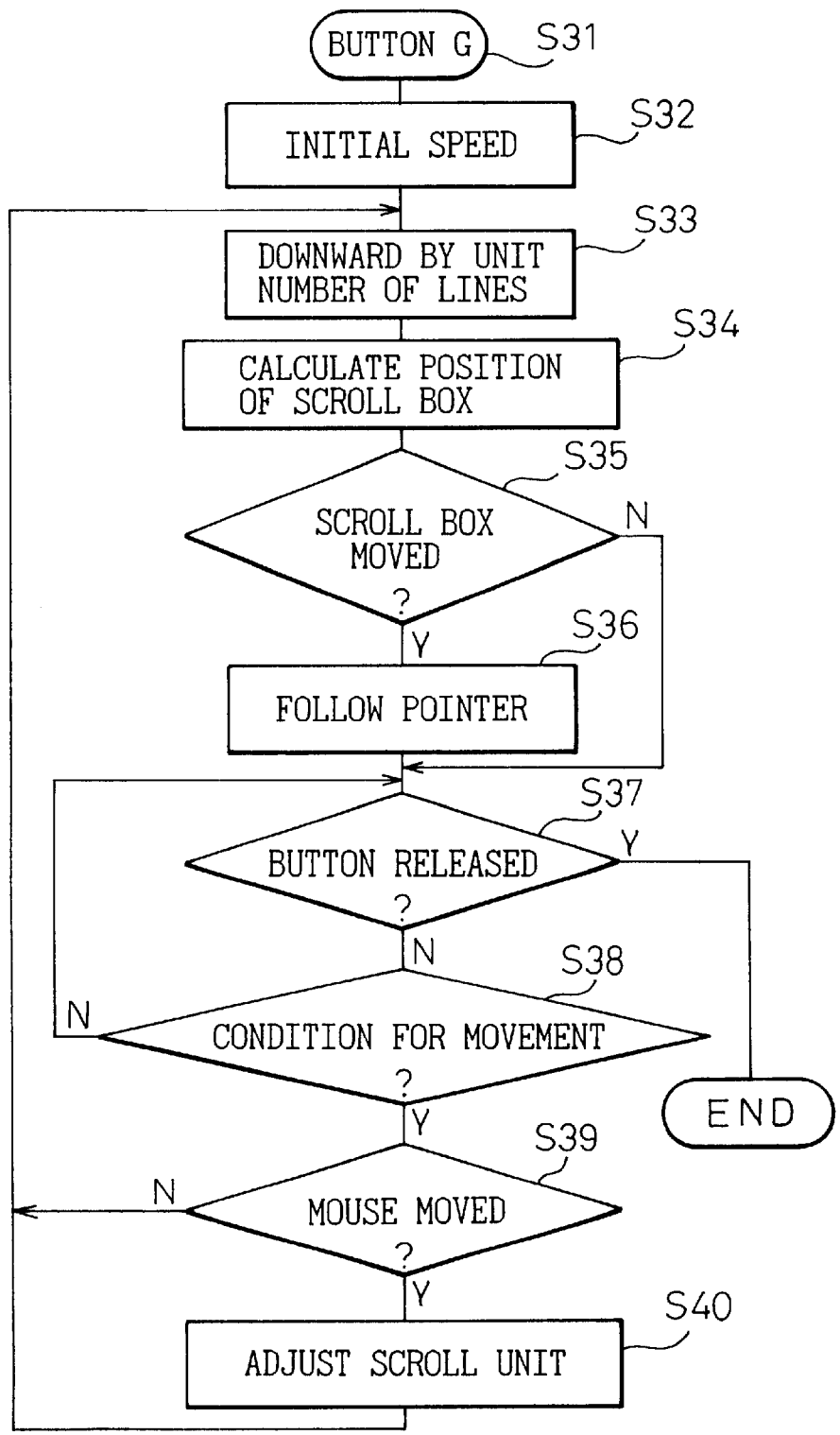
FIG. 6 is a flowchart for explaining the third operation in which the scroll buttons of the scroll bar shown in FIG. 3 are depressed.

FIG. 6 shows the operation performed when the scroll button G integrated with the scroll box E is depressed.

If the mouse is operated to set the pointer 15 to the scroll button G, the left button 27 of the mouse 25 is depressed and the scroll button G is also depressed (step S31), the initial value of the scroll speed is set (step S32). In this example, the scroll speed is determined by a predetermined timing and the unit number of lines scrolled at a time, i.e. the scroll unit. The scroll unit is set to one line as an initial value.

After setting the initial speed, the document 14 in the window 13 is scrolled downward by the scroll unit (step S33). The position of the scroll box E is calculated, and the scroll box E is displayed at the calculated position in the scroll bar 12 (step S34).

The process decides whether the scroll box E is moved or not within the scroll bar 12 (whether the scroll box E has moved at least a distance corresponding to one pixel of the CRT 23) (step S35). If the answer is affirmative (Y of step S35), the pointer 15 is relocated a distance corresponding to the number of the pixels moved, and the pointer 15 follows the scroll box E (step S36). In the case where the scroll box E has not moved in the scroll bar 12 (N of step S35), the pointer 15 is not moved.

Step S37 decides whether the finger of the operator has left the mouse button or not (Step S37) and also whether or not the condition for movement has been met (step S38). Steps 37 and 38 are similar to steps 14 and 15 of FIG. 4, respectively. As long as the left button 27 is kept depressed, the scroll is repeated every scroll unit as in Step S32 once every lapse of a predetermined time length. Once the operator's finger leaves the mouse button (Y of Step S37), the process ends and the scroll comes to stop at the particular time.

After the lapse of a predetermined length of time in Step S38, the process decides whether or not the mouse 25 has moved (Step S39). If the mouse has not moved, the process returns to step S33 where the document 14 is scrolled downward by the same number of scroll units as in the preceding case. Specifically, as long as the mouse is not moved, the scroll speed remains constant.

To change the scroll speed, the operator moves the mouse 25 and adjusts the scroll speed. In the case where the operator desires to increase the scroll speed, the mouse 25 is moved toward the operator. In the case where the operator desires to decrease the scroll speed, on the other hand, the mouse 25 is moved in the opposite direction.

Once the mouse 25 is moved (Y of step S39), the unit number of lines by which the scroll moves, i.e. the scroll unit, is adjusted (step S40). In the case under consideration, the scroll unit, i.e. the unit number of lines is changed in accordance with the direction and amount in which the mouse is moved. Assume, for example, that the mouse now moves one line at a scroll timing after each predetermined time length. For the scroll speed to be increased, the scroll unit increases by two lines, four lines, etc. in accordance with the coverage (distance moved) of the mouse 25 toward the operator. For the scroll to be decreased from high (say, four lines in scroll unit) to low speed, in contrast, the scroll unit is decreased by two lines, one line, etc. in accordance with the coverage away from the mouse 25. In decreasing the scroll speed, it is possible that the document is scrolled in the opposite direction if the mouse 25 is moved in the direction of decreasing the scroll speed beyond the lowest speed limit (one line).

After the scroll unit is adjusted, the document is scrolled by the scroll unit after adjustment in step S33.

An explanation will be given about the case in which the scroll button C located at a position symmetric with respect to the scroll button G is depressed. In such a case, step S31 in FIG. 6 is changed to depress the scroll button C, and step S33 is changed to scroll upward. The other overlapped steps will not be described.

Figure 7:
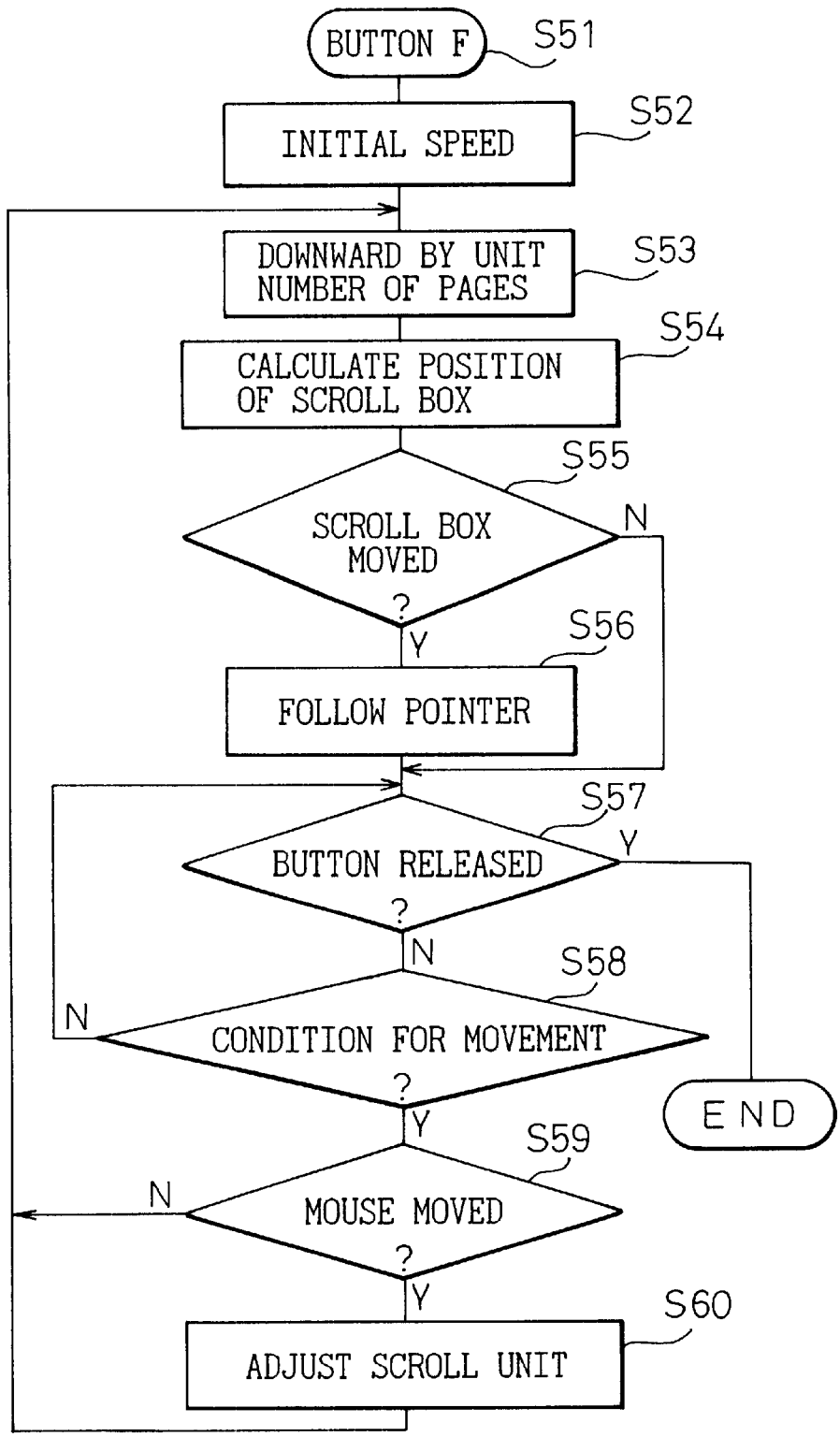
FIG. 7 is a flowchart for explaining the fourth operation in which the scroll buttons of the scroll bar shown in FIG. 3 are depressed.

FIG. 7 shows the operation performed in the case where the scroll button F integrated with the scroll box E is depressed.

The operation shown in FIG. 7 is substantially similar to that of FIG. 6. When the scroll button F is depressed in step S51, the document 14 is scrolled downward by a scroll unit in step S52. The initial value of the scroll unit is one page. The subsequent steps of operation are similar to the corresponding steps in FIG. 6, except that the step numbers in the order of thirty and forty in FIG. 6 are replaced by the step numbers in the order of fifty and sixty, respectively. Refer to the explanation of the operation in FIG. 6.

An explanation will be given about the case in which the scroll button D located at a position symmetric with respect to the scroll button F is depressed. In such a case, step S51 in FIG. 7 is changed to depress the scroll button D, and the document 14 is scrolled upward instead of downward in step S53. The other overlapped steps will not be explained again.

Figure 8:
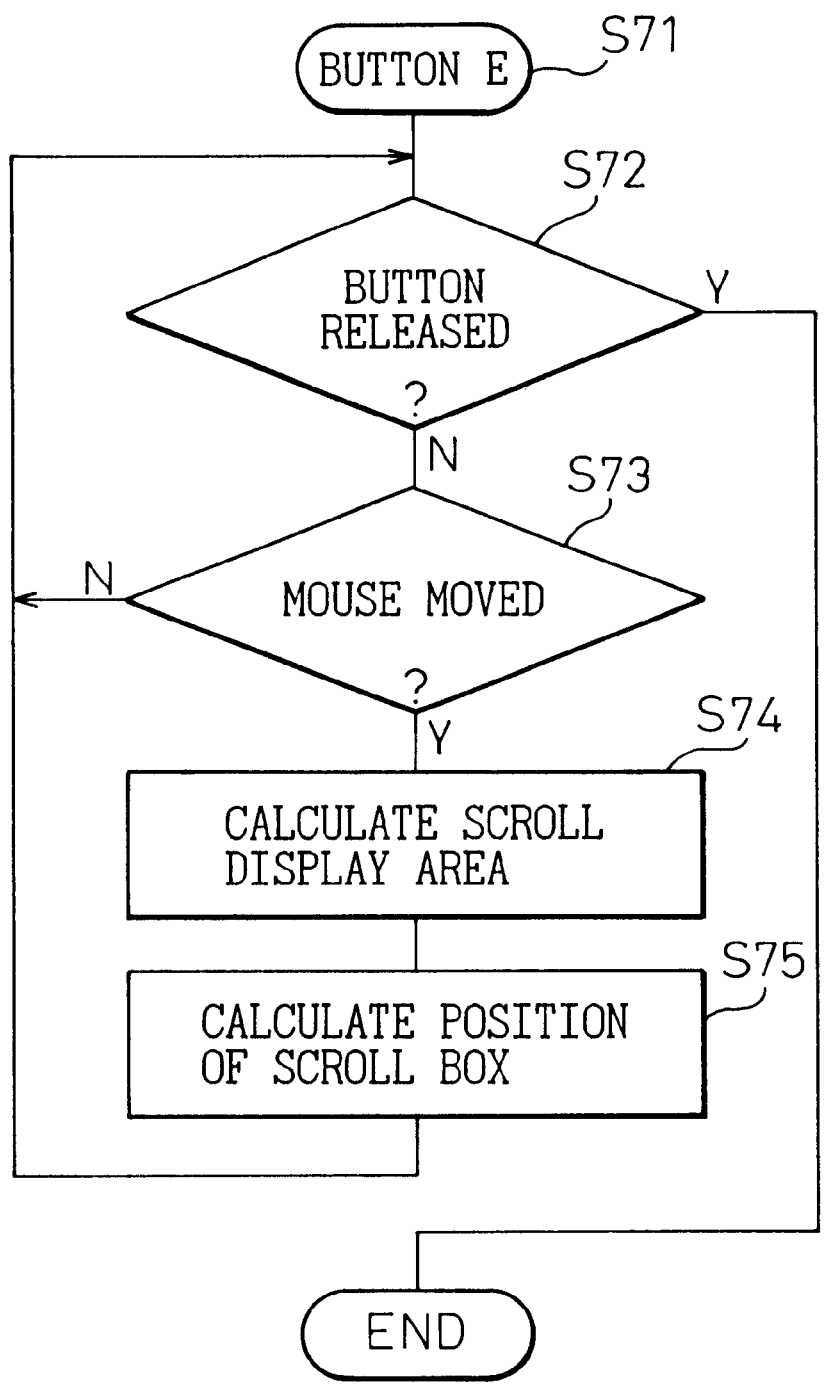
FIG. 8 is a flowchart for explaining the fifth operation in which the scroll buttons of the scroll bar shown in FIG. 3 are depressed.

FIG. 8 shows the operation performed when the scroll box E is dragged. The operation of the scroll box E is similar to that of the conventional case.

When the mouse 25 is operated and thereby the pointer 15 is set to the scroll box E, the left button 27 of the mouse 25 is depressed, the button E is depressed (step S71) is moved, the left button 27 kept depressed, the mouse 25 (N of step S72, Y of step S73) then, in accordance with the direction and amount of movement of the mouse 25, the position at which the document 14 is displayed after scroll is calculated and the corresponding portion of the document 14 is displayed in the window 13 (step S74). Also, the position of the scroll box E is calculated, and the scroll box E is moved to the calculated position in the scroll bar 12. In the case where the mouse 25 is not moved (N of step S73), in contrast, the operator's finger is detached from the mouse button only after the mouse 25 is moved. Once the operator's finger leaves the mouse button (Y of step S72), the process ends and the scroll box E stops.

An embodiment of the invention was described above. The present invention is not limited to the above-mentioned embodiment, but can be modified in various ways within the scope defined in the claims. Some examples are described below.

Figure 9:
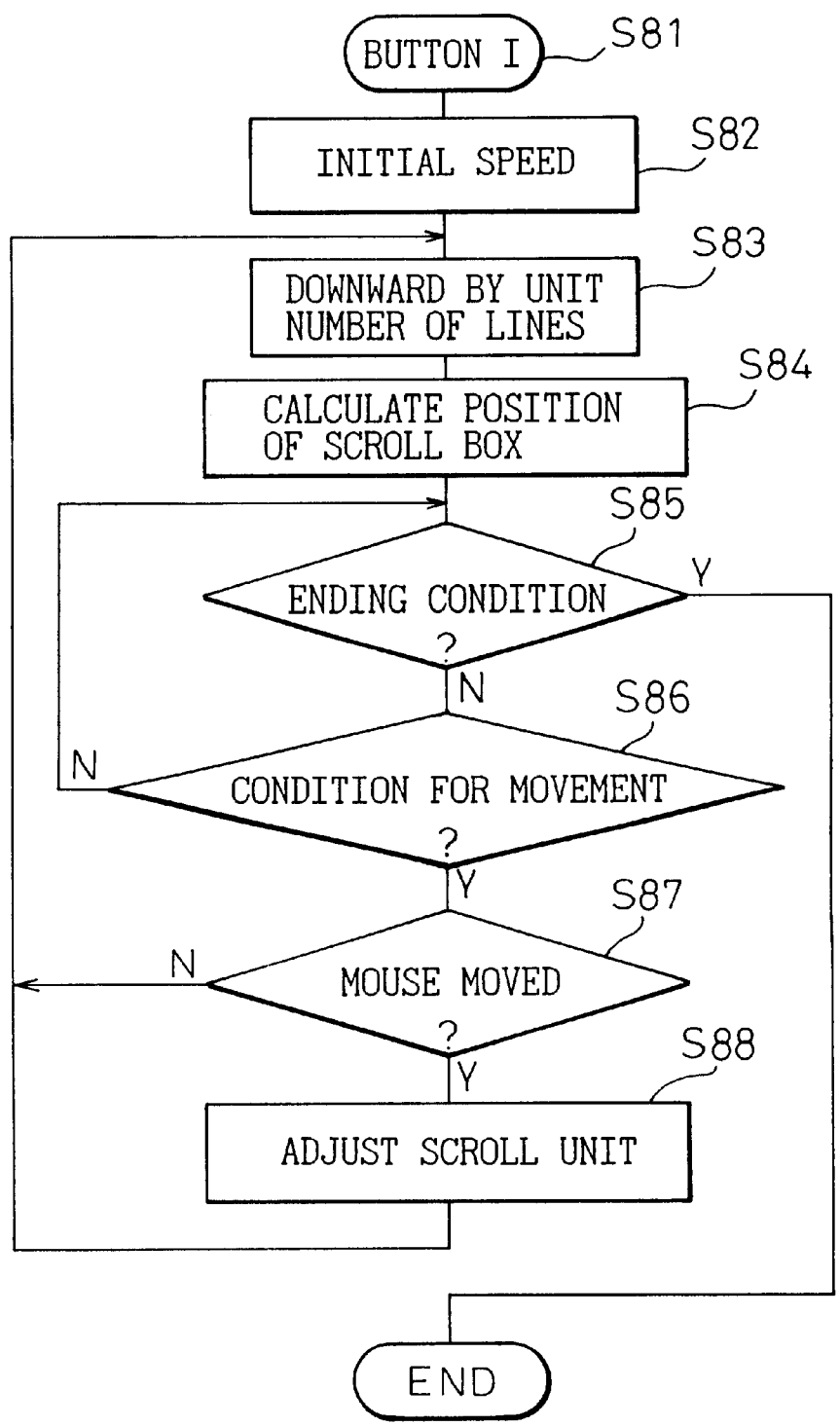
FIG. 9 is a flowchart showing a modification of the operation shown in FIG. 4.

FIG. 9 shows an example modification of the operation of the scroll buttons. In each of the above-mentioned examples, when the scroll is to be continued, the left button 27 of the mouse 25 is required to be kept depressed. In the flowchart of FIG. 9, in contrast, the continuous scroll is made possible by operating the right button 26 of the mouse 25. Also, as a condition for ending the scroll, the scroll button (left or right) of the mouse 25 is clicked, or one of the keys on the keyboard 24 is depressed. Either of the operations can stop the scroll.

Thus, the operator is required to depress a scroll button only at the time of starting and ending the scroll, but is not required to keep the mouse 25 depressed during the scroll, thus facilitating the operation. The example shown in FIG. 9 includes the operation of adjusting the scroll speed by moving the mouse 25.

In FIG. 9, the pointer 15 is set to the scroll button I, the right button 26 is clicked, the scroll button I is depressed (step S81) and the initial value of the scroll speed is set (step S82), the initial speed was explained already with reference to FIGS. 6 and 7. The document 14 is scrolled downward by a scroll unit (initial value of one line) in the window 13 (step S83). The position of the scroll box E is calculated, and the scroll box E is displayed at the calculated position in the scroll bar 12 (step S84).

The process decides whether the ending condition is met or not (step S85). If the ending condition is not met (N of step S85), step S86 decides whether or not the condition for movement is met. This condition for movement is the same as the corresponding one described above. If the condition for movement is not met (N of step S86), the process returns to step S85. Thus, the process is terminated and the scroll stops. The scroll continues, therefore, until the left button 27 is clicked or otherwise the ending condition is met. In step S81, the right button 26 is only clicked but not required to be kept depressed.

Once the condition for movement is met (Y of step S86), the process decides whether the mouse 25 has moved or not (step S87). The decision as to whether the mouse 25 has moved or not (step S87) and the adjustment of the scroll unit (step S88) are similar to the corresponding steps of FIGS. 6 and 7. If the mouse 25 has been moved, the scroll unit (number of lines) is adjusted and the scroll speed is changed in accordance with the coverage of the mouse 25. After that, the process returns to step S83, and the document 14 is further scrolled downward by a scroll unit. As a result, even during the time when the scroll is continued, the scroll speed can be adjusted by operating the mouse 25, thus improving the operability.

The scroll button I was explained above with reference to FIG. 9. This operation is applicable to the other scroll buttons A, B and H fixed in the scroll bar 12. As for the scroll button A, step S81 of FIG. 9 is changed to depress the scroll button A and step S83 is changed to scroll upward instead of downward. As for the scroll button H, step S81 of FIG. 9 is changed to depress the scroll button H, and the scroll unit in step S83 is changed to page. Also, as for the scroll button B, step S81 is changed to depress the scroll button B and step S83 is changed to scroll upward instead of downward.

The scroll buttons C, D, F and G integrated with the scroll box E, as described with reference to FIGS. 6 and 7, can be used, as in FIG. 9, to begin continuous scroll by the operation of the right button 26. This operation can be performed by changing part of the flowcharts of FIGS. 6 and 7 in the following manner. For the other steps of operation, refer to the description of FIGS. 6 and 7.

As for the scroll button G, step S37 in FIG. 6 is changed to decide whether the ending condition is met or not. As for the scroll button C, step S31 of FIG. 6 is changed to depress the scroll button C, step S33 is changed to scroll upward instead of downward and step 37 is changed to decide whether the ending condition has been met or not.

As for the scroll button F, step S57 of FIG. 7 is changed to decide whether the ending condition has been met or not. As for the scroll button D, step S51 in FIG. 7 is changed to depress the scroll button D, step S53 is changed to scroll upward instead of downward, and step S57 is changed to decide whether the ending condition has been met.

Figure 10A:
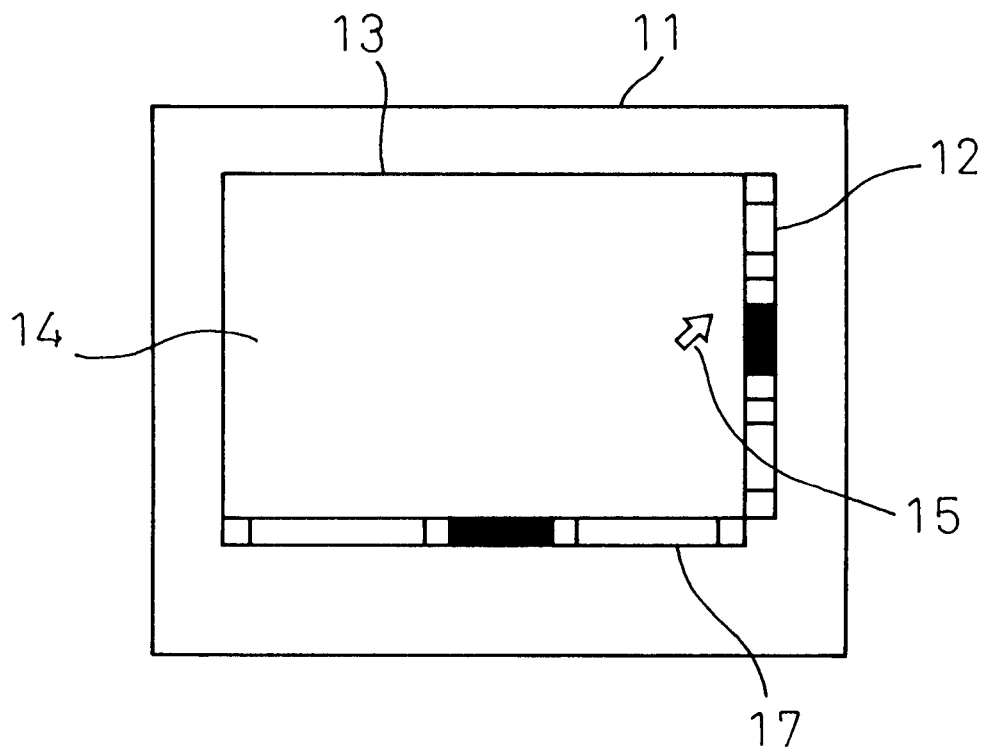
Figure 10B:
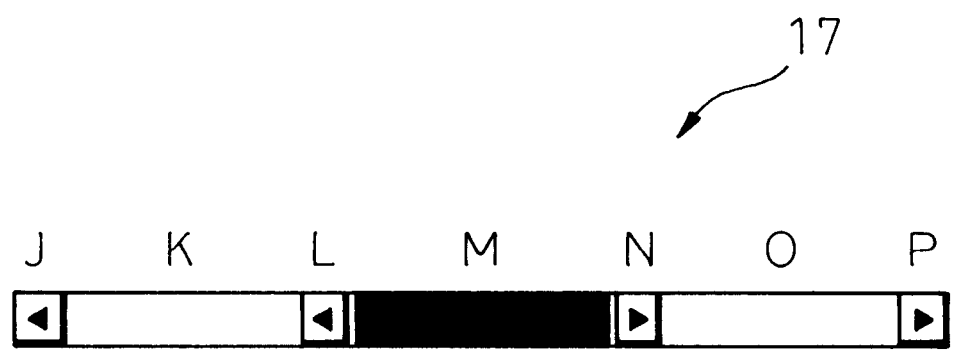

FIGS. 10A and 10B show a modification of the scroll bar.

The foregoing description of embodiments referred to the case in which only the vertical scroll bar 12 is arranged on the screen 11. This invention is applicable also to the horizontal scroll bar.

In FIG. 10A, the vertical scroll bar 12 is arranged on the right side of the screen 11, and a horizontal scroll bar 17 on the lower side. As shown in FIG. 10B, the horizontal scroll bar 17 has fixedly arranged at one end thereof a scroll button J for scrolling the document 14 leftward by one character and at the other end thereof a scroll button P for scrolling the document 14 rightward by one character. Further, a scroll box M is arranged, which is adapted to move horizontally in the scroll bar 17 and has a length representing the ratio of the whole width of the document 14 and indicating the position along the width of the whole document. The scroll box M includes scroll buttons L and N adapted to move integrally with each other. The area K between the scroll buttons J and L and the area O between the scroll buttons N and P are not used in the case under consideration.

The operation of the scroll buttons J, L, N, P and the scroll box M is similar to that of the scroll buttons of the vertical scroll bar 12 described above, and will not be described again.

The horizontal scroll bar 17 and the vertical scroll bar 12 can be arranged at the same time, or only one of them can be arranged as desired.

Figure 11A:
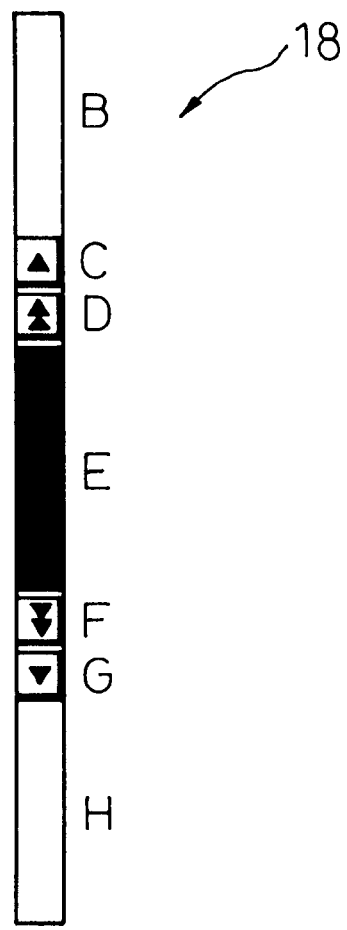
Figure 11B:

FIGS. 11A and 11B show an example modification of the scroll buttons in a scroll bar.

The vertical scroll bar 18 shown in FIG. 11A, as seen from the comparison with the scroll bar 12 of FIG. 3B, has no conventional fixed scroll buttons A, B, H, I but has only scroll buttons C, D, F, G integrated with the scroll box E. This is also the case with the horizontal scroll bar 17 shown in FIG. 11B, which has only scroll buttons L, N integrated with the scroll box M.

In the embodiments described above, the initial value of the scroll buttons A, C, G, I, J, L, N, P was set as one line, while the initial value of the scroll buttons B, D, F, H is set as one page. Nevertheless, the initial values can be set to any arbitrary number of lines or pages. For example, a modification is possible in which five lines or five pages can be scrolled at a time by a single depression of the scroll button.

What is claimed is:

1. A display apparatus for displaying a scroll bar on a screen, comprising:

a display unit to display, in said scroll bar, a scroll box which displays a size and position of data displayed on said screen relative to a whole amount of the data and a plurality of scroll buttons operated for scrolling the data on said screen;

a scrolling unit to scroll said data on said screen when one of said scroll buttons is operated;

a scroll box moving unit to move said scroll box in said scroll bar in the same direction and in an operatively interlocked relationship with the scroll of said data; and a scroll button moving unit to move said scroll buttons within said scroll bar in operatively interlocked relation with said scroll box.

2. A display apparatus for displaying a scroll bar on a screen, comprising:

a display unit to integrally display, in said scroll bar, a scroll box which displays a relative size and relative position of data displayed on said screen with respect to a whole amount of the data and a plurality of scroll buttons operated for scrolling the data on said screen;

a scrolling unit to scroll said data on said screen when one of said scroll buttons is operated; and a scroll box and scroll button moving unit to move said scroll box and said scroll buttons in said scroll bar in operatively interlocked relation with the scroll of said data.

3. The display apparatus of claim 2, further comprising:

a pointer display unit to display a pointer on said screen and moving said pointer on said screen in accordance with an operation of a pointing device thereby to operate one of said scroll buttons.

4. The display apparatus of claim 3, further comprising:

a pointer moving unit to move said pointer integrally with said scroll buttons when said scroll buttons move.

5. The display apparatus of claim 4, wherein said display unit displays additional scroll buttons fixed on said scroll bar, and wherein said scrolling unit scrolls said data also when one of said fixed scroll buttons is operated.

6. The display apparatus of claim 5, wherein said scroll buttons include a scroll button for scrolling in a first unit amount and a scroll button for scrolling in a second unit amount, and wherein said scrolling unit scrolls said data in a designated unit amount.

7. The display apparatus of claim 5, wherein said scrolling unit changes a scroll speed in accordance with the operation of said pointing device.

8. The display apparatus of claim 4, wherein said scroll buttons include a scroll button for scrolling in a first unit amount and a scroll button for scrolling in a second unit amount, and wherein said scrolling unit scrolls said data in a designated unit amount.

9. The display apparatus of claim 4, wherein said scrolling unit changes a scroll speed in accordance with the operation of said pointing device.

10. A display control method for controlling a scroll bar displayed on a screen, comprising:

displaying, in said scroll bar, a scroll box which displays a size and position of data displayed on said screen relative to a whole amount of the data and a plurality of scroll buttons operated for scrolling the data on said screen;

scrolling said data on said screen when one of said scroll buttons is operated;

moving said scroll box in said scroll bar in the same direction and in operatively interlocked relation with the scroll of said data; and moving said scroll buttons within said scroll bar in operatively interlocked relation with said scroll box.

11. A display control method for controlling a scroll bar displayed on a screen, comprising:

integrally displaying, in said scroll bar, a scroll box which displays a size and position of data displayed on said screen relative to a whole amount of the data and a plurality of scroll buttons operated for scrolling the data on said screen;

scrolling said data on said screen when one of said scroll buttons is operated; and moving said scroll box and said scroll buttons in said scroll bar in operatively interlocked relation with the scroll of said data.

12. The display control method of claim 11, further comprising:

displaying a pointer on said screen and moving said pointer on said screen thereby to operate one of said scroll buttons in accordance with an operation of said pointing device.

13. The display control method of claim 12, further comprising:

moving said pointer integrally with said scroll buttons when said scroll buttons move.

14. The display control method of claim 13, wherein said display of the scroll box and scroll buttons further includes displaying additional scroll buttons fixed on said scroll bar; and wherein said scrolling of said data further includes scrolling said data also when one of said fixed scroll buttons is operated.

15. The display control method of claim 13, wherein said display of the scroll box and scroll buttons further includes displaying a first scroll button for scrolling said data in a first unit amount and a second scroll button for scrolling said data in a second unit amount, and wherein said scrolling of said data further includes scrolling said data in a designated unit amount.

16. The display control method of claim 13, wherein said scrolling of said data further includes changing a scroll speed in accordance with the operation of said pointing device.

17. The display control method of claim 12, wherein said display of the scroll box and scroll buttons further includes displaying a first scroll button for scrolling said data in a first unit amount and a second scroll button for scrolling said data in a second unit amount, and wherein said scrolling of said data further includes scrolling said data in a designated unit amount.

18. The display control method of claim 12, wherein said scrolling of said data further includes changing a scroll speed in accordance with the operation of said pointing device.

19. A computer-readable storage medium for storing a program for executing a method comprising:

displaying, in a scroll bar displayed on the screen, a scroll box which displays a size and position of data displayed on said screen relative to a whole amount of the data and a plurality of scroll buttons operated for scrolling the data on said screen;

scrolling said data on said screen when one of said scroll buttons is operated;

moving said scroll box in said scroll bar in the same direction and in operatively interlocked relation with the scroll of said data; and moving said scroll buttons within said scroll bar in operatively interlocked relation with said scroll box.

20. A computer-readable storage medium for storing a program for executing a method comprising:

integrally displaying, in a scroll bar displayed on the screen, a scroll box which displays a size and position of data displayed on said screen relative to a whole amount of the data and a plurality of scroll buttons operated for scrolling the data on said screen;

scrolling said data on said screen when one of said scroll buttons is operated; and moving said scroll box and said scroll buttons in said scroll bar in operatively interlocked relation with the scroll of said data.

\* \* \* \* \*